(12) United States Patent
Wyszogrod et al.

(10) Patent No.: US 6,488,326 B2
(45) Date of Patent: Dec. 3, 2002

(54) SEAT STRUCTURE IN AUTOMOBILE

(75) Inventors: Jose N. Wyszogrod, Los Angeles, CA (US); Frank D. Moburg, Whittier, CA (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/767,920

(22) Filed: Jan. 24, 2001

(65) Prior Publication Data

US 2001/0011829 A1 Aug. 9, 2001

Related U.S. Application Data

(62) Division of application No. 09/417,214, filed on Oct. 13, 1999, now Pat. No. 6,231,102.

(51) Int. Cl.$^7$ .................................................. B60N 2/00
(52) U.S. Cl. .................. 296/64; 296/65.05; 296/65.16; 296/65.1; 297/335
(58) Field of Search ............................... 296/64, 65.05, 296/65.16, 65.01; 297/335, 331, 378.12

(56) References Cited

U.S. PATENT DOCUMENTS

| | | | |
|---|---|---|---|
| 4,191,417 A | 3/1980 | Ferrara | 296/65 |
| 4,971,395 A | 11/1990 | Coussemacq et al. | 297/378 |
| 5,044,683 A | 9/1991 | Parsson | 296/65.1 |
| 5,056,849 A * | 10/1991 | Norris, Jr. et al. | 296/65.1 |
| 5,248,178 A | 9/1993 | Brambilia | 296/65.1 |
| 5,681,079 A | 10/1997 | Robinson | 297/61 |
| 5,702,145 A | 12/1997 | Fowler et al. | 296/66 |
| 5,795,023 A | 8/1998 | Kayumi | 297/331 |
| 5,868,451 A | 2/1999 | Uno et al. | 296/66 |
| 5,913,570 A * | 6/1999 | Yoshida et al. | 296/66 |
| 6,010,190 A | 1/2000 | Downey | 297/340 |
| 6,030,038 A | 2/2000 | Namba et al. | 297/257 |
| 6,070,934 A | 6/2000 | Schaefer et al. | 297/14 |
| 6,070,939 A | 6/2000 | Matsuo et al. | 297/378.12 |
| 6,102,463 A | 8/2000 | Swanson et al. | 296/37.15 |
| 6,158,799 A * | 12/2000 | Guilford | 296/65.05 |
| 6,231,102 B1 * | 5/2001 | Wyszogrod et al. | 296/65.16 |

FOREIGN PATENT DOCUMENTS

FR 881601 4/1942

* cited by examiner

*Primary Examiner*—Ken Patel
(74) *Attorney, Agent, or Firm*—Arent Fox Kintner Plotkin & Khan, PLLC

(57) ABSTRACT

In an automobile including front and rear seats (Sf) and (Sr) disposed at a longitudinal distance on a vehicle body floor (F), rearward-extending support arms (A) are provided at lower portions of sides of the front seat (Sf). The rear seat (Sr) includes a seat portion (3) which is connected at its front end to tip portions of the support arms (A) and pivotally turnable between a predetermined tilted-down position (3H) and a standing position (3S), and a seat back (4) which is connected at its lower end to a front end of a rear floor section (Fr) and pivotally turnable between a predetermined standing position (4S) and a tilted-down position (4H). A receiving surface (Fm) for supporting the seat portion (3) lying in the tilted-down position (3H) is formed between the front floor section (Ff) and the rear floor section (Fr) higher in level than the front floor section (Fr), and when the rear seat (Sr) is in service, the seat portion (3) is retained in the tilted-down position (3H), and the seat back (4) is retained in the standing position (4S). Thus, an occupant can sit in a forward-facing attitude on the rear seat. Moreover, the baggage chamber space is enlarged, and the floor structure simplified. Further, the seat arrangement is diversified.

4 Claims, 5 Drawing Sheets

SEAT STRUCTURE IN AUTOMOBILE

This is a Divisional of application Ser. No. 09/417,214 filed Oct. 13, 1999 now U.S. Pat. No. 6,231,102.

BACKGROUND OF THE INVENTION

1. Field of the Invention

The present invention relates to a seat structure in an automobile including front and rear seats disposed at a longitudinal distance on a vehicle body floor.

2. Description of the Related Art

A seat structure is already proposed in which in order to retract a rear seat of an automobile into a position flush with a vehicle body floor, for example, a recess Fg for retraction of the seat is defined in the vehicle body floor at the rear of the rear seat Sr', as shown in FIG. 9, and the rear seat Sr' with a seat back tilted down and folded onto a seat portion is turned around through 180° and accommodated within the recess Fg, and in this state, a bottom f of the seat portion is used as a portion of a rear floor surface (for example, see French Patent Specification No. 881601).

The above proposed seat structure suffers from a problem that it is required not only that the seat back in a standing position be disposed in a rearward-facing attitude, but also that a large recess capable of accommodating the entire rear seat in a folded-up state be especially defined in a portion of the vehicle body floor immediately behind the rear seat, thus making the structure of the vehicle body floor correspondingly complicated.

SUMMARY OF THE INVENTION

Accordingly, it is an object of the present invention to provide a seat structure in an automobile, wherein the above problem can be overcome, and moreover, the arrangement of the rear seat can be diversified.

To achieve the above object, according to a first aspect and feature of the present invention, there is provided a seat structure in an automobile including front and rear seats disposed at a longitudinal distance therebetween a vehicle body floor, wherein the vehicle body floor includes a front floor section having the front seat disposed thereon, and a rear floor section which is disposed at the rear of the front floor section and which is higher in level than the front floor section, and rearward-extending support arms are provided at lower portions of sides of the front seat. The rear seat is comprised of a seat portion which is connected at a front end thereof to tip portions of the support arms and pivotally turnable between a predetermined tilted-down position and a standing position in which the seat position is righted forwards, and a seat back which is connected at a lower end thereof to a front end of the rear floor section and pivotally turned between a predetermined standing position and a tilted-down position in which the seat back is tilted down forwards. A receiving surface for supporting the seat portion lying in the tilted-down position is formed between the front floor section and the rear floor section, and when the rear seat is in service, the seat portion is retained in the tilted-down position, and the seat back is retained in the standing position.

With the first feature, when the rear seat is in service, a clearance enough for the feet of an occupant on the rear seat to be inserted between the front end of the seat portion and a back surface of the front seat lying in the tilted-down position, can be ensured by properly selecting the length of the support arms, whereby the occupant can sit unstrainedly in a forward-facing attitude on the rear seat. When the rear seat is not in service, even if a large recess for retraction of the rear seat is not defined in the vehicle body floor, the rear seat can be retracted compactly in a connected relation to the rear floor section in a state in which the seat back lying in the tilted-down position has been superposed on an upper surface of the seat portion. Therefore, the baggage chamber space is enlarged, and the floor structure is simplified. Further, the standing positions and the tilted-down positions of the seat portion and the seat back of the rear seat can be selected independently and hence, the seat arrangement is diversified and the convenience is enhanced, correspondingly.

According to a second aspect and feature of the present invention, in addition to the first feature, when the rear seat is not in service, the seat back lying in the tilted-down position is superposed on an upper surface of the seat portion likewise lying in the tilted-down position, and in this state, the back surface of the seat back is substantially flush with the rear floor section. With this feature, when the rear seat with the seat back in the tilted-down position being superposed on the seat portion likewise in the tilted-down position is not in service, a full-flat and wide rear floor section is defined, which contributes to a further enlargement of the baggage chamber space and the enhancement in convenience.

According to a third aspect and feature of the present invention, there is provided a seat structure in an automobile including front and rear seats disposed at a longitudinal distance therebetween on a vehicle body floor, wherein the vehicle body floor includes a front floor section having the front seat disposed thereon, and a rear floor section which is disposed at the rear of the front floor section and which is higher in level than the front floor section. The rear seat is comprised of a seat portion which is connected at a front end thereof to inner walls of the vehicle body at the rear of the front seat and pivotally turnable between a predetermined tilted-down position and a standing position in which the seat position is righted forwards, and a seat back which is connected at a lower end thereof to a front end of the rear floor section and pivotally turnable between a predetermined standing position and a tilted-down position in which the seat back is tilted down forwards. A receiving surface for supporting the seat portion lying in the tilted-down position is formed between the front floor section and the rear floor section, and when the rear seat is in service, the seat portion is retained in the tilted-down position, and the seat back is retained in the standing position.

With the third feature, when the rear seat is in service, a clearance enough for the feet of an occupant on the rear seat to be inserted between the front end of the seat portion lying in the tilted-down position and a back surface of the front seat can be ensured by properly selecting the position of connection of the inner walls of the vehicle body to the front end of the seat portion. Moreover, it is not required that support arms on the seat portion be extended from the front seat in order to ensure such clearance. Therefore, the occupant can sit unstrainedly in a forward-facing attitude on the rear seat without being obstructed by the arms. In addition, when the rear seat is not in service, even if a large recess for retraction of the rear seat is not defined in the vehicle body floor, the rear seat can be retracted compactly in a connected relation to the rear floor section in a state in which the seat back lying in the tilted-down position has been superposed on an upper surface of the seat portion. Therefore, the baggage chamber space is enlarged, and the floor structure is simplified. Further, the standing positions and the tilted-down positions of the seat portion of the rear seat and the seat back can be selected independently and hence, the seat arrangement is diversified and the convenience is enhanced, correspondingly.

According to a fourth aspect and feature of the present invention, in addition to the third feature, when the rear seat is not in service, the seat back lying in the tilted-down position is superposed on an upper surface of the seat portion likewise lying in the tilted-down position, and in this state, the back surface of the seat back is substantially flush with the rear floor section. With this feature, when the rear seat with the seat back in the tilted-down position being superposed on the seat portion likewise in the tilted-down position is not in service, a full-flat and wide rear floor section is defined, which contributes to a further enlargement of the baggage chamber space and the enhancement in convenience.

BRIEF DESCRIPTION OF THE DRAWINGS

FIGS. 1 to 4 show a first embodiment of the present invention, wherein

FIG. 1 is a longitudinal sectional view of an essential portion of an automobile;

FIG. 2 is a view illustrating a first retracted state of a rear seat;

FIG. 3 is a view illustrating a second retracted state of a rear seat; and

FIG. 4 is a view showing another service mode of the rear seat.

FIGS. 5 to 8 show a second embodiment of the present invention, wherein

FIG. 5 is a view similar to FIG. 1;

FIG. 6 is a view similar to FIG. 2;

FIG. 7 a view similar to FIG. 3; and

FIG. 8 is a sectional view taken along a line 8—8 in FIG. 5.

DESCRIPTION OF THE PREFERRED EMBODIMENTS

First, a first embodiment of the present invention will now be described with reference to FIGS. 1 to 4. A forward-facing front and rear seats Sf and Sr are disposed at a longitudinal distance on a vehicle body floor F of an automobile V. The front seat Sf is a reclining seat which is comprised of a seat portion 1, and a seat back 2 longitudinally pivotally connected by pivot P1s to a rear end of the seat portion 1, as in the conventionally normal automobile. The angle of the seat back 2 is adjustable to any value by a control lever which is not shown, and the seat portion 1 is supported on a front floor section Ff with a position adjusting mechanism Aj interposed therebetween, so that its position can be adjusted longitudinally.

The rear seat Sr is also comprised of a seat portion 3 and a seat back 4, but the feature of the present invention resides in the structure of mounting of the seat portion 3 and the seat back 4. Such structure will be described below in detail.

The vehicle body floor F includes a rear floor section Fr which is located in the rear of the front floor section Ff where the front seat Sf is disposed, and which is higher in level than the front floor section Ff. Further, an intermediate step is formed between the front floor section Ff and the rear floor section Fr, and has an upper surface Fm which serves as a receiving surface on which the seat portion 3 of the rear seat Sr is placed and supported in a tilted-down position 3H, as described hereinafter.

Figure 1:
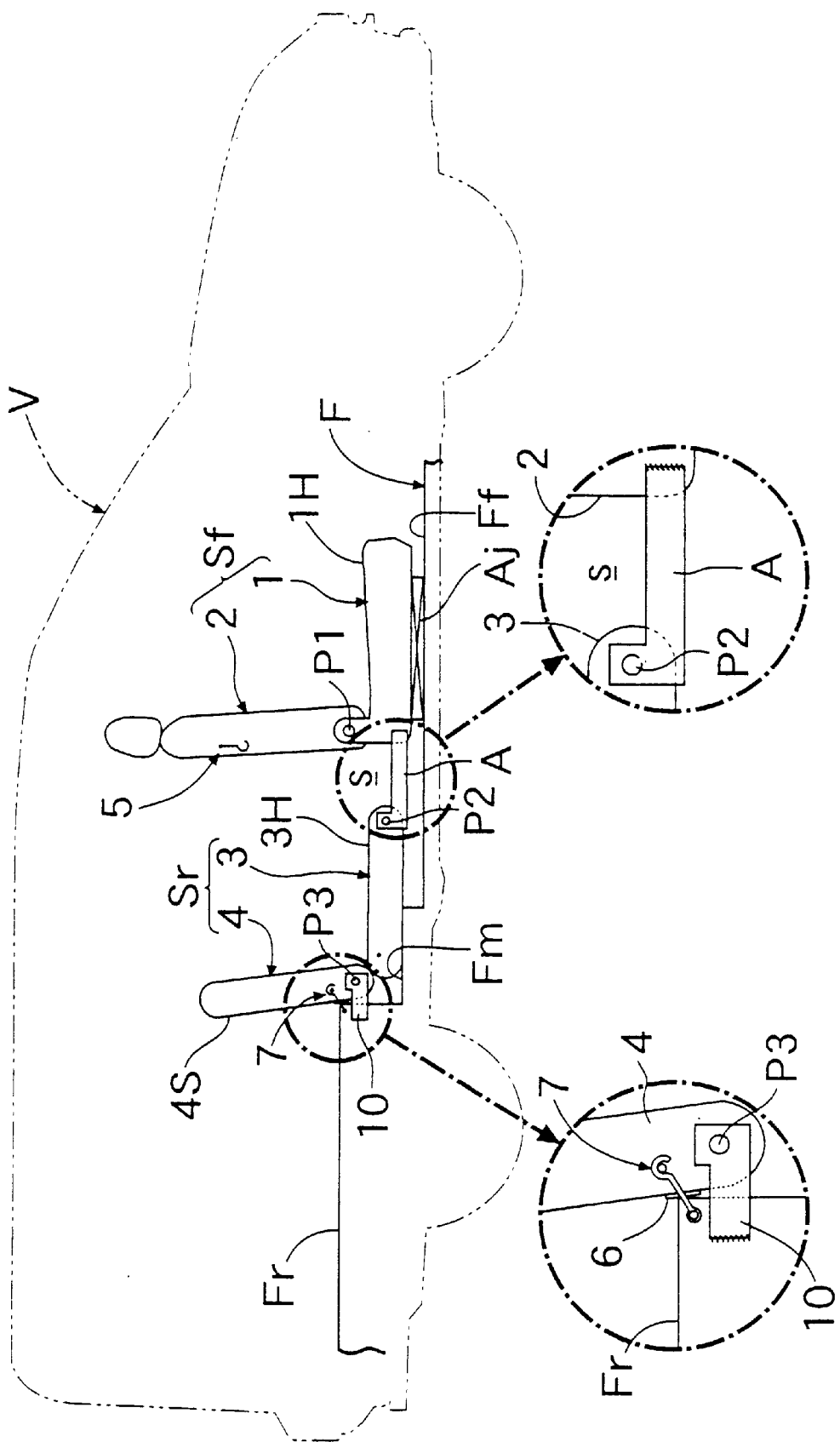

A pair of left and right rearward-extending support arms A are integrally provided at a rear end of the front seat Sf (the seat portion 1 in the illustrated embodiment) on opposite left and right sides. A tip portion of each of the arms A is formed into an upward-bent hook shape. A front end of the seat portion 3 of the rear seat Sr is connected by pivots P2 to tip ends of the arms A, so that the seat portion 3 can be pivotally turned about such connections between the substantially horizontal tilted-down position 3H and a standing position 3S in which the seat portion 3 has been righted forwards. The length of the support arm A is set so as to ensure a clearance s enough for the feet of an occupant on the rear seat to be inserted between a front end of the seat portion 3 and a back surface of the front seat Sf in the tilted-down position 3H, when the rear seat Sr is in service, as shown in FIG. 1.

When the seat portion 3 is in the standing position 3S, the seat surface thereof faces a back surface of the seat back 2 and lies substantially on the seat back 2. The righted attitude of the seat portion 3 is retained by a coupling means 5 provided between the seat portion 3 and the seat back 2 of the front seat Sf for releasably coupling the seat portion 3 and the seat back 2 to each other (an engage pin provided on one of the seat portion 3 and the seat back 2, and an engage hook provided on the other in the illustrated embodiment). The seat portion 3 is placed and supported on the receiving surface Fm between the front floor section Ff and the rear floor section Fr in the tilted-down position 3H, whereby the tilted-down attitude of the seat portion 3 is maintained.

The seat back 4 of the rear seat Sr is connected by pivots P3 at its lower end to the front end of the rear floor section Fr (a hinge bracket 10 extending in front of such front end in the illustrated embodiment), so that the seat back 4 is pivotally turned about such connections between a predetermined standing position 4S in which the seat back 4 has been slightly tilted rearwards, and a substantially horizontal tilted-down position 4H in which the seat back 4 has been tilted down forwards.

The seat back 4 is constructed so that a lower portion of its back surface (a covering portion of a reinforcing plate 6 in the illustrated embodiment) is brought into engagement with the front end of the rear floor section Fr, whereby a further rearward turning movement is limited. The righted attitude of the seat back 4 is maintained by a coupling means 7 provided between the seat back 4 and the rear floor section Fr for releasably coupling the seat back 4 and the rear floor section Fr to each other (an engage hook provided on one of the seat back 4 and the rear floor section Fr, and an engage pin provided on the other in the illustrated embodiment).

Figure 2:
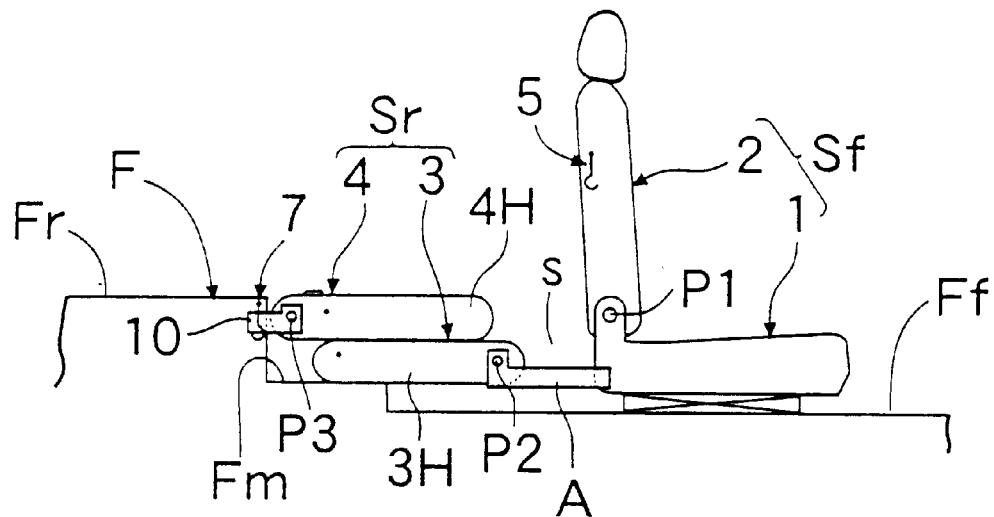

When the rear seat Sr is not in service, the seat back 4 lying in the tilted-down position 4H is superposed on the upper surface of the seat section 3 likewise lying in the tilted-down position 3H, as shown in FIG. 2, and in this state, the back surface of the seat back 4 is substantially flush with the rear floor section Fr.

The operation of the embodiment will be described below. In the rear seat Sr having the above-described structure, the standing positions 3S and 4S and the tilted-down positions 3H and 4H of the seat portion 3 and the seat back 4 can be selected independently, and hence, the degree of freedom of the selection is increased correspondingly, and a variety of seat arrangements are feasible, as described hereinafter.

First, when the rear seat Sr is in usual service, the seat portion 3 is retained in the tilted-down position 3H, and the seat back 4 is retained in the standing position 4S, as shown in FIG. 1. In this case, it is possible to ensure the clearance s enough for the feet of an occupant on the rear seat to be inserted between the front end of the seat portion 3 and the back surface of the front seat Sf in the tilted-down position 3H by properly selecting the length of the support arms A to which the front end of the seat portion 3 is connected by the pivots P2, and hence, the occupant can sit unstrainedly in a forward-facing attitude on the rear seat Sf with his or her feet placed into the clearance s.

When the rear seat Sr is not in service, the seat back 4 lying in the tilted-down position 4H is superposed on the upper surface of the seat portion 3 likewise lying in the tilted-down position 3H, as shown in FIG. 2, and in this state, the back surface 4f of the seat back 4 is substantially flush with the rear floor section Fr. Therefore, even if a large recess for retraction of the rear seat is not defined in the vehicle body floor F, the rear seat Sr can be retracted compactly in a connected relation to the rear floor section Fr, with the seat back 4 and the seat portion 3 vertically superposed on each other, thereby bringing about an enlargement of space in a baggage chamber and the simplification of the floor structure. Particularly, in the illustrated embodiment, the back surface 4f of the seat back 4 lying in the tilted-down position 4H can be substantially flush with the rear floor section Fr and hence, a full-flat widened rear floor section is provided, thereby bringing about a further enlargement of space in the baggage chamber and an enhancement in convenience.

Figure 3:
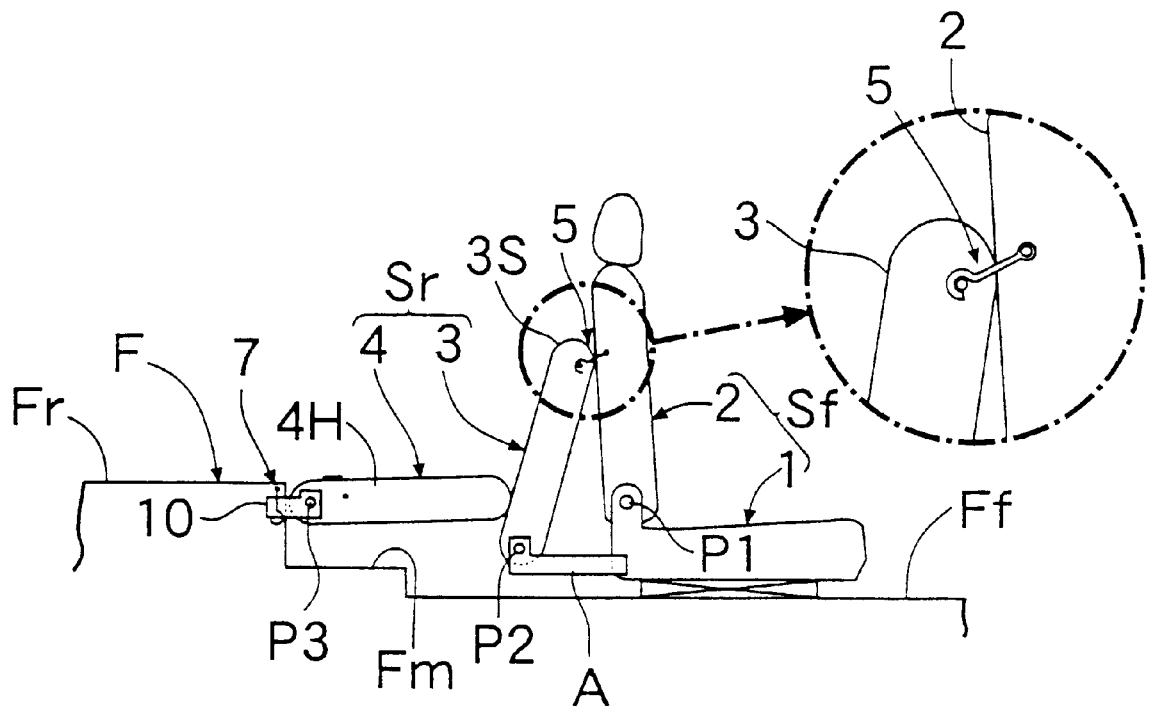
Figure 4:
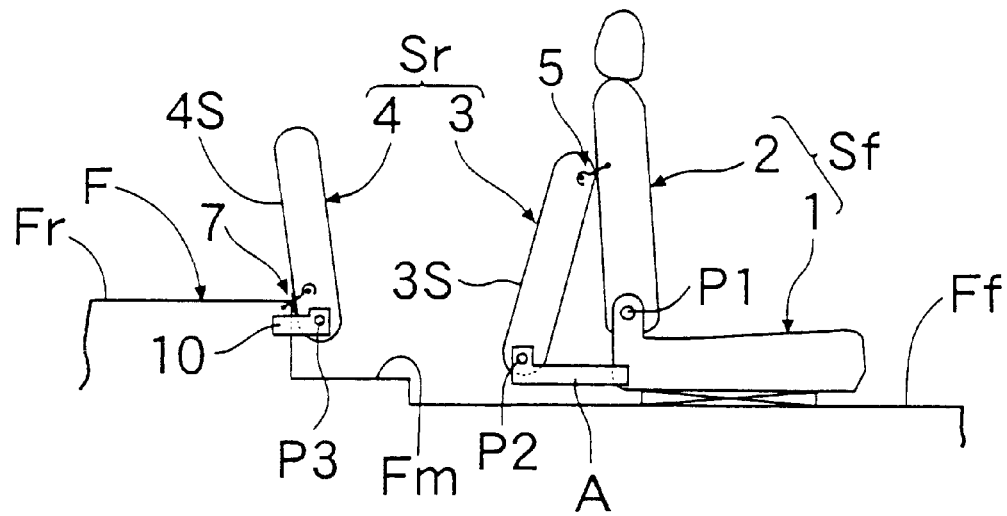

When the rear seat Sr is not in service, the seat back 4 lying in the tilted-down position 4H may be brought into engagement with the lower portion of the back surface of the seat portion 3 lying in the standing position 3H, as shown in FIG. 3. In this case, a clearance between the front end of the seat back 4 lying in the tilted-down position 4H and the back surface of the front seat Sf can be covered with the seat portion 3. Therefore, there is no possibility that a piece of baggage on the rear floor section Fr may be dropped into the clearance, and a clearance below the seat back 4 can be utilized as a small-article compartment.

In a seat arrangement shown in FIG. 3, if the seat back 2 of the front seat Sf is tilted forwards, the seat portion 3 of the rear seat Sr can be tilted down forwards to follow the seat back 2. Especially, when the seat back 4 in an assistant driver's seat is tilted forwards to tilt the seat portion 3 of the corresponding rear seat Sr forwards, a longitudinally long and full-flat space is defined in a region from the rear floor section Fr to the front seat and hence, a long piece of baggage can be loaded unstrainedly.

Further, if both of the seat portion 3 and the seat back 4 of the rear seat Sr are retained in the standing positions 3S and 4S, the baggage chamber can be used in a such a manner that it is partitioned into front and rear parts by the seat back 4. In addition, a longitudinally long baggage chamber space is defined in front of the seat back 4 (between the seat back 4 and the seat portion 3) and hence, this state is convenient when a longitudinally long piece of baggage is loaded without tilting it laterally.

A second embodiment of the present invention will be described below with reference to FIGS. 5 to 8. In the second embodiment, a front end of a seat portion 3 of a rear seat Sr is connected by pivots P2' to inner walls W of a vehicle body in the rear of a front seat Sf through support arms A', and the seat portion 3 is pivotally turned about the connections between a substantially horizontal tilted-down position 3H and a standing position 3S in which it has been righted forwards substantially vertically. The support arm A' is fixed to the front end of the seat portion 3.

A receiving surface Fm' is provided at a position intermediate between front and rear floor sections Ff and Fr to support the seat portion 3 in its tilted-down position 3H. The receiving surface Fm' is continuous in the same level to the front floor section Ff in the illustrated embodiment, and the seat portion 3 is inclined slightly rearwards in its tilted-down position 3H. The righted attitude of the seat portion 3 is maintained by a coupling means 5' provided between the seat portion 3 and the seat back 2 of the front seat Sf for releasably coupling the seat portion 3 and the seat back 2 to each other. In the illustrated embodiment, the coupling means 5' is comprised of an electric locking pin 20 provided within the seat portion 3, and an engage bore (not shown) which is defined in the inner wall W of the vehicle body F and into and from which the pin 20 is engageable and disengageable.

A window pane 21 is provided within the seat portion 3 for movement out of and into the seat portion 3 and driven by a known electric power window mechanism PW. Therefore, if the window pane 21 is lifted from an upper end of the seat portion 3 in a state in which the seat portion 3 has been retained in its standing position 3S, a front seat occupant compartment with the front seat Sf present therein and a baggage space in the rear of the front seat occupant compartment can be separated by the window pane 21 and the seat portion 3.

The seat back 4 of the rear seat Sr is connected at its lower end to the front end of the rear floor section Fr by a structure similar to that in the first embodiment. The tilted-down position 4H of the seat back 4 is maintained by a coupling means 22 provided between the seat back 4 and the inner wall W of the vehicle body F for releasably coupling the seat back 4 and the inner wall W to each other. In the illustrated embodiment, the coupling means 22 is comprised of an electric locking pin 23 provided within the seat back 4, and an engage bore (not shown) which is defined in the inner wall W of the vehicle body F and into and from which the pin 23 is engageable and disengageable.

When the seat back 4 is in the tilted-down position 4H, the seat portion 3 likewise lying in the tilted-down position 3H is accommodated, so that it is superposed on the seat back 4 and moreover, a clearance is defined between the upper surface of the seat portion 3 and the lower surface of the seat back 4. Therefore, it is possible to prevent a shock from being applied from a piece of baggage on the rear floor section Fr or the like to the window pane 21 provided within the seat portion 3, which is effective for preventing the breaking of the window pane.

The structure other than that described above (e.g., a structure of the front seat Sf) is similar to that in the first embodiment and hence, the description thereof is omitted.

Figure 5:
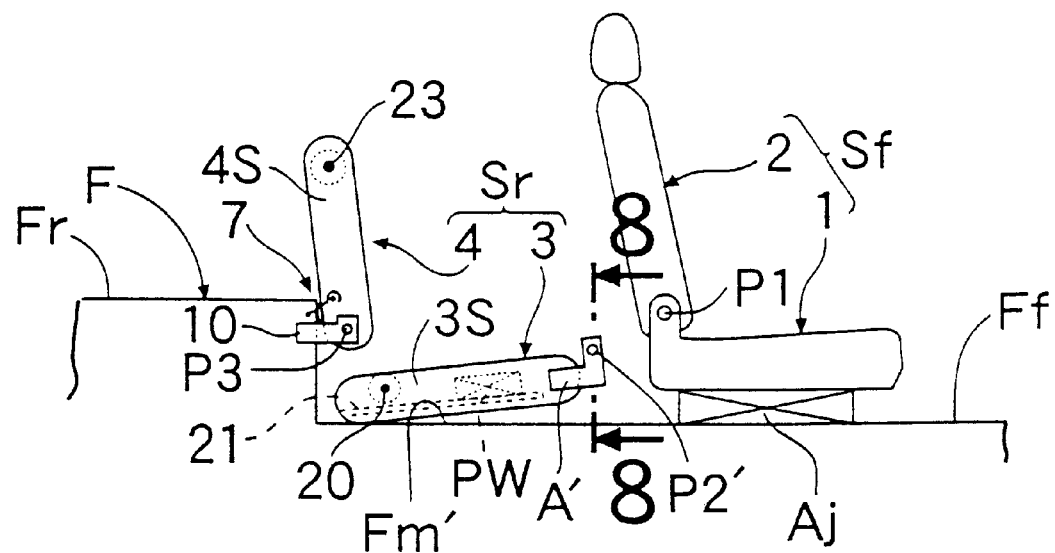
Figure 6:
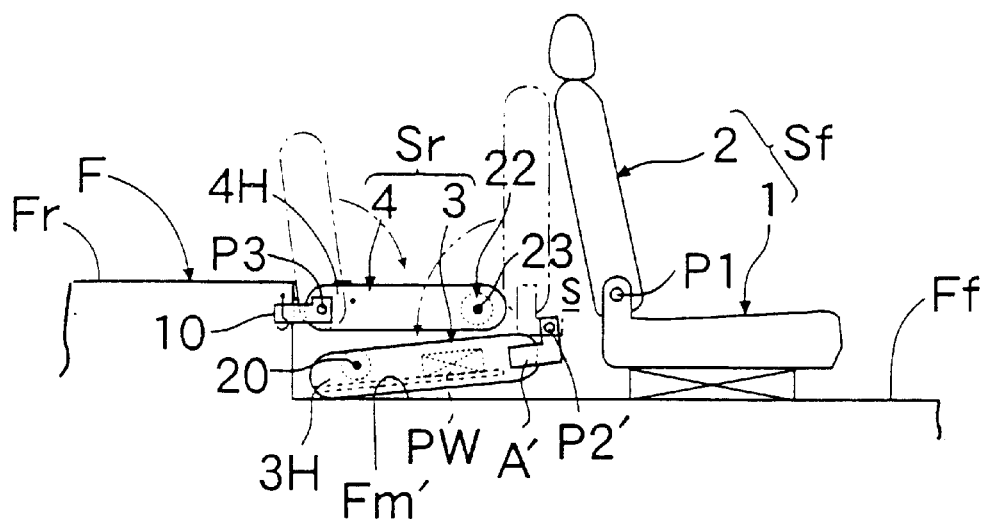
Figure 7:
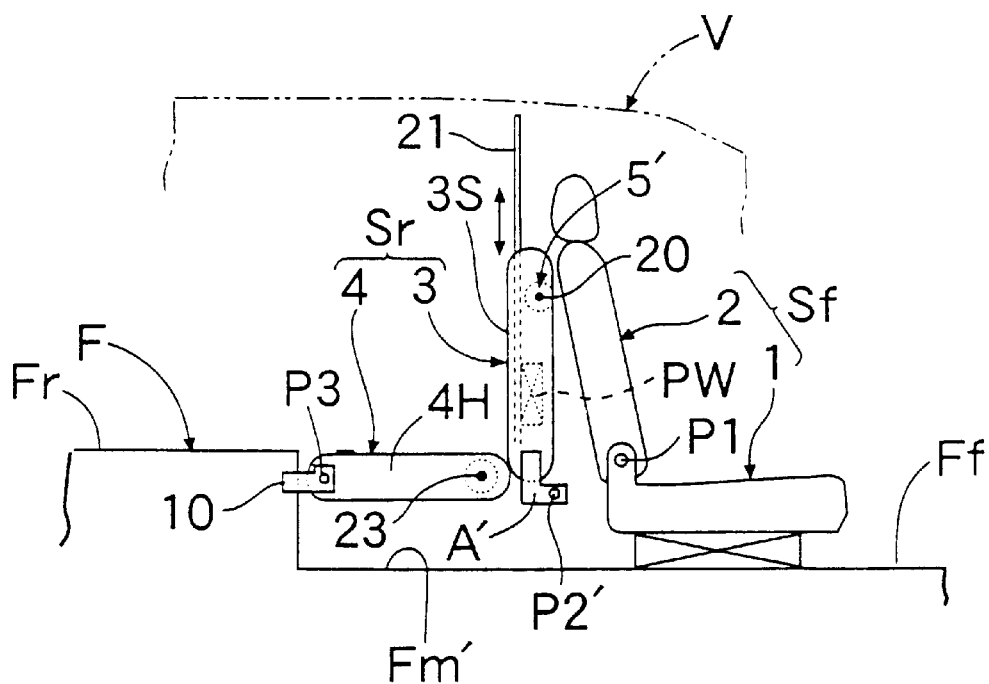
Figure 8:
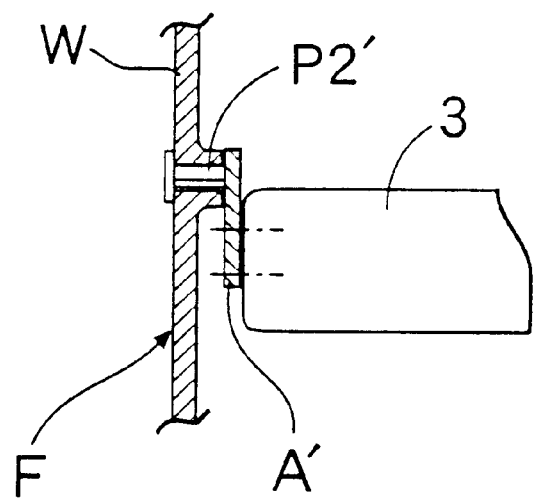
Figure 9:
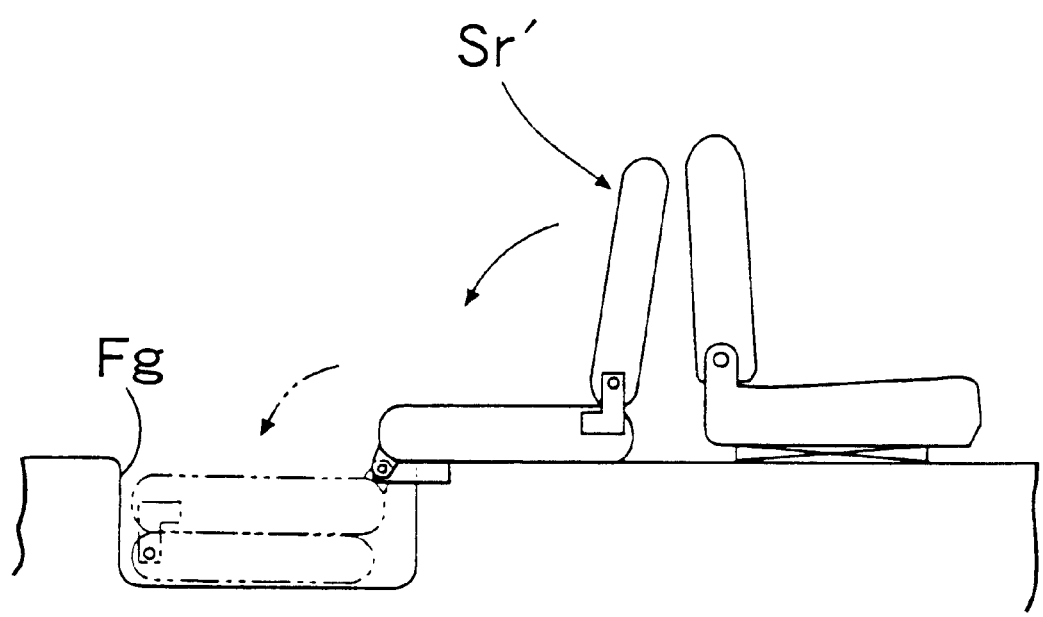
FIG. 9 is a side elevational view of a prior art seat structure.

Even in the second embodiment, a variety of seat arrangements are feasible as shown in FIGS. 5 to 7, as in the first embodiment. Especially, in the second embodiment, a clearance enough for the feet of an occupant on the rear seat to be inserted between the front end of the seat portion 3 lying in the tilted-down position 3H and the back surface of the front seat Sf can be ensured by properly selecting the position of connection of the inner walls W of the vehicle body to the support arm A' and the shape of the arm A', when the rear seat Sr is in service. Moreover, it is unnecessary to use a support arm A as used in the first embodiment, which extends rearwards over a long distance from the front seat Sf in order to ensure the clearance. Therefore, it is possible for an occupant to sit on the rear seat Sr unstrainedly in a forward-facing attitude without being obstructed by such an arm A.

Although the embodiments of the present invention have been described in detail, it will be understood that the present invention is not limited to the above-described embodiments, and various modifications in design may be made without departing from the spirit and scope of the invention.

For example, in the seat arrangement shown in FIG. 3 in the first embodiment, the seat back 4 is engaged with the lower portion of the rear surface of the seat portion 3 lying in the standing position 3H to lie above the receiving surface Fm, but according to the present invention, the seat back 4 lying in the tilted-down position 4H may be placed directly on the receiving surface Fm without being engaged with the lower portion of the rear surface of the seat portion 3 lying in the standing position 3H. In addition, the locking pin 23 provided within the seat back 4 may be used as in the second embodiment. Further, in the second embodiment, the standing position of the seat portion 3 may be maintained by a coupling means 5 as used in the first embodiment in place of the locking pin 20 provided within the seat portion 3, and the seat back 4 may be maintained in the tilted-down position 4H as in the first embodiment in place of the locking pin 23 provided within the seat back 4.

In addition, the receiving surface Fm for supporting the seat portion 3 lying in the tilted-down position 3H is formed above the intermediate step between the front and rear floor sections Ff and Fr in the first embodiment, but the receiving surface Fm may be formed continuously in the same level to the front floor section Ff, as is the receiving surface Fm' in the second embodiment. Further, the receiving surface Fm' in the second embodiment may be formed above the intermediate step between the front and rear floor sections Ff and Fr, as is the receiving surface Fm in the first embodiment.

Further, the front end of the seat portion 3 of the rear seat Sr is connected by the pivots P2' to the inner wall W of the vehicle body through the support arms A' extending from the front end in the second embodiment, but according to the present invention, the front end of the seat portion 3 may be connected directly to the inner wall W of the vehicle body by the pivots P2' with the support arms A' omitted depending on the shape of the seat portion 3.

The rear seat Sr may be of either a laterally divided type or a laterally integral bench seat type. When side doors are provided in correspondence to the front and rear seats in the second embodiment, a center pillar between the front and rear doors may be used as the inner wall W of the vehicle body.

What is claimed is:

1. A seat structure in an automobile including front and rear seats disposed at a longitudinal distance therebetween on a vehicle body floor, wherein said vehicle body floor includes a front floor section having said front seat disposed thereon, and a rear floor section which is disposed at the rear of said front floor section and which is higher in level than said front floor section;

said rear seat is comprised of a seat portion which is connected at a front end thereof to inner walls of the vehicle body at the rear of said front seat and pivotally turnable between a predetermined tilted-down position and a standing position in which the seat portion is righted forwards, and a seat back which is connected at a lower end thereof to a front end of said rear floor section and pivotally turnable between a predetermined standing position and a tilted-down position in which the seat back is tilted down forwards;

a receiving surface contiguous with and at the same level as the front floor section for supporting said seat portion lying in the tilted-down position is formed between said front floor section and said rear floor section, and when said rear seat is in service, said seat portion is retained in the tilted-down position, and said seat back is retained in the standing position.

2. A seat structure in an automobile according to claim 1, wherein when said rear seat is not in service, said seat back lying in the tilted-down position is superposed on an upper surface of said seat portion likewise lying in the tilted-down position, and in this state, the back surface of said seat back is substantially flush with said rear floor section.

3. A seat structure in an automobile according to claim 1, wherein, when said rear seat is not in service and said seat back lies in the tilted-down position over the upper surface of said seat portion likewise lying in the tilted-down position, a clearance is formed between the upper surface of said seat portion and a lower surface of said seat back.

4. A seat structure in an automobile according to claim 1, wherein when said rear seat is not in service, said seat back lying in the tilted-down position is positioned over an upper surface of said seat portion likewise lying in the tilted-down position, and in this state, the back surface of said seat back is substantially flush with said rear floor section.

\* \* \* \* \*